United States Patent
Lee et al.

(10) Patent No.: US 12,126,267 B2
(45) Date of Patent: *Oct. 22, 2024

(54) RESONANT CONVERTER WITH A SYNCHRONOUS RECTIFIER CONTROLLER HAVING ONTIME AND OFFTIME COUNTING

(71) Applicants: SANKEN ELECTRIC CO., LTD., Niiza (JP); SANKEN ELECTRIC KOREA CO., LTD., Seoul (KR)

(72) Inventors: Eunsuk Lee, Seoul (KR); Jungyul Kim, Seoul (KR); Masaaki Shimada, Niiza (JP); Shinji Aso, Niiza (JP); Mitsutomo Yoshinaga, Niiza (JP); Hanju Kang, Niiza (JP)

(73) Assignees: SANKEN ELECTRIC CO., LTD., Niiza-shi (JP); SANKEN ELECTRIC KOREA CO., LTD., Seoul (KR)

( * ) Notice: Subject to any disclaimer, the term of this patent is extended or adjusted under 35 U.S.C. 154(b) by 296 days.

This patent is subject to a terminal disclaimer.

(21) Appl. No.: 17/715,081

(22) Filed: Apr. 7, 2022

(65) Prior Publication Data

US 2023/0327568 A1 Oct. 12, 2023

(51) Int. Cl.
*H02M 3/335* (2006.01)
*H02M 1/00* (2006.01)

(52) U.S. Cl.
CPC ..... *H02M 3/33592* (2013.01); *H02M 1/0012* (2021.05); *H02M 3/33571* (2021.05)

(58) Field of Classification Search
CPC ................................................ H02M 3/33592
See application file for complete search history.

(56) References Cited

U.S. PATENT DOCUMENTS 9,356,535 B2   5/2016 Iorio et al.
2010/0172157 A1* 7/2010 Chen ................. H02M 3/33592
                                                    363/21.02

(Continued)

FOREIGN PATENT DOCUMENTS

JP           5867141 B2      2/2016

OTHER PUBLICATIONS

Y. Wei, Q. Luo and H. A. Mantooth, "Synchronous Rectification for LLC Resonant Converter: An Overview," in IEEE Transactions on Power Electronics, vol. 36, No. 6, pp. 7264-7280, Jun. 2021, (Year: 2021).*

*Primary Examiner* — Peter M Novak
(74) *Attorney, Agent, or Firm* — METROLEX IP W GROUP, PLLC; Robert L. Scott, Esq.

(57) ABSTRACT

A detector compares a drain voltage with a first threshold voltage and outputs a first detection signal. An ON counter detects a period of time during which a current flows in a switching, counts the period of time based on a predetermined clock cycle. An OFF counter detects a period of time during which a current flow through the body diode in a state where no current flows in the switching circuit, counts the period of time. An off-time setting circuit sets the time to turn off the switching circuit. A first comparison circuit compares the cycle count value with turn off time. A second comparison circuit compares a cycle count value output by the ON counter with a comparison result output by the first comparison circuit and outputs a signal to stop transmitting a PWM signal.

5 Claims, 5 Drawing Sheets

(56) References Cited

U.S. PATENT DOCUMENTS

2015/0026062 A1\* 1/2015 Paulsen ................. G06Q 20/29
705/44
2023/0327569 A1\* 10/2023 Lee ................... H02M 3/33592
363/21.02

\* cited by examiner

RESONANT CONVERTER WITH A SYNCHRONOUS RECTIFIER CONTROLLER HAVING ONTIME AND OFFTIME COUNTING

BACKGROUND

The present disclosure relates to a switching control-type power supply apparatus with a transformer for power conversion, and in particular, to a current resonance-type switching power supply apparatus that includes a series resonance circuit on a primary side of the transformer and a synchronous rectification switch on a secondary side.

U.S. Pat. No. 9,356,535 to Iorio et al. ("Iorio") discloses a control device for a transistor of a switching converter rectifier generates a control signal of the transistor and includes a circuit to measure the conduction time of the body diode of the transistor cycle by cycle. In the device disclosed in Iorio, when the conduction time is greater than a first threshold, the off time instant of the transistor is delayed by a first quantity in the next cycles, until the conduction time is less than the first threshold and greater than a second threshold. When the conduction time is between the first and second thresholds, the off time instant is delayed by a fixed second quantity in the next cycles until the conduction time is lower than the second threshold, with the second quantity less than the first quantity. When the conduction time is lower than the second threshold, the off time instant is advanced by the second quantity in the next cycle.

In general, in a synchronous rectification circuit, a drain-to-source voltage is in phase with a drain current due to parasitic inductance by a wire of a semiconductor chip. In particular, since a rectification current in an LLC circuit is similar to a sinusoidal current, the phase lead of the drain-to-source voltage causes a significantly increases in a detection voltage at the rise of the current, which causes the detection voltage to decrease more quickly in a direction of decreasing current and reach a threshold voltage, which in turn causes a gate drive voltage to be turned off sooner despite the drain current flowing (even when the drain current flows). From the above, a period of switching to rectification on a body diode side becomes longer, resulting in lower efficiency.

The above-mentioned problem may be solved according to Iorio, by using a time constant circuit to compensate for time. However, problems arise in that the use of a time constant circuit may limit the response of a synchronous rectification circuit.

SUMMARY

A switching power supply apparatus according to one or more embodiments may include: a series resonance circuit on a primary side; a rectification smoothing circuit on a secondary side; and a transformer comprising a first coil connected to the series resonance circuit on the primary side and a second coil connected to a rectification smoothing circuit on the secondary side and that produces a current in the second coil in response to a current in the first coil. The rectification smoothing circuit on the secondary side may include a switching circuit used for synchronous rectification connected in series with the second coil; and a secondary-side control circuit that controls the switching circuit to turn on and off. The secondary-side control circuit may include a detector that compares a drain voltage of the switching circuit with a first threshold voltage and outputs a first detection signal; an ON counter that detects a period of time during which a current flows in the switching circuit based on the first detection signal, counts the period of time based on a predetermined clock cycle, and outputs a cycle count value; a previous cycle memory that holds the cycle count value; an OFF counter that detects a period of time during which a current flow through the body diode in a state where no current flows through the on-resistance Ron in the switching circuit based on the first detection signal, counts the period of time based on a predetermined clock cycle, and outputs an off-count value; an off-time setting circuit that sets the time to turn off the switching circuit based on the off-count value; a first comparison circuit that compares the cycle count value stored in the previous cycle memory with the time to turn off the switching circuit set by the off-time setting circuit; a second comparison circuit that compares a cycle count value output by the ON counter with a comparison result output by the first comparison circuit and outputs a signal to stop transmitting a PWM (pulse width modulation) signal; a SR latch that receives the signal from the second comparison circuit to stop transmitting the PWM signal and outputs the PWM signal to be applied to a gate of the switching circuit; and a gate driver that outputs a gate drive signal for on/off control of the switching circuit based on the PWM signal.

DETAILED DESCRIPTION

A switching power supply apparatus according to one or more embodiments is described.

Figure 1:
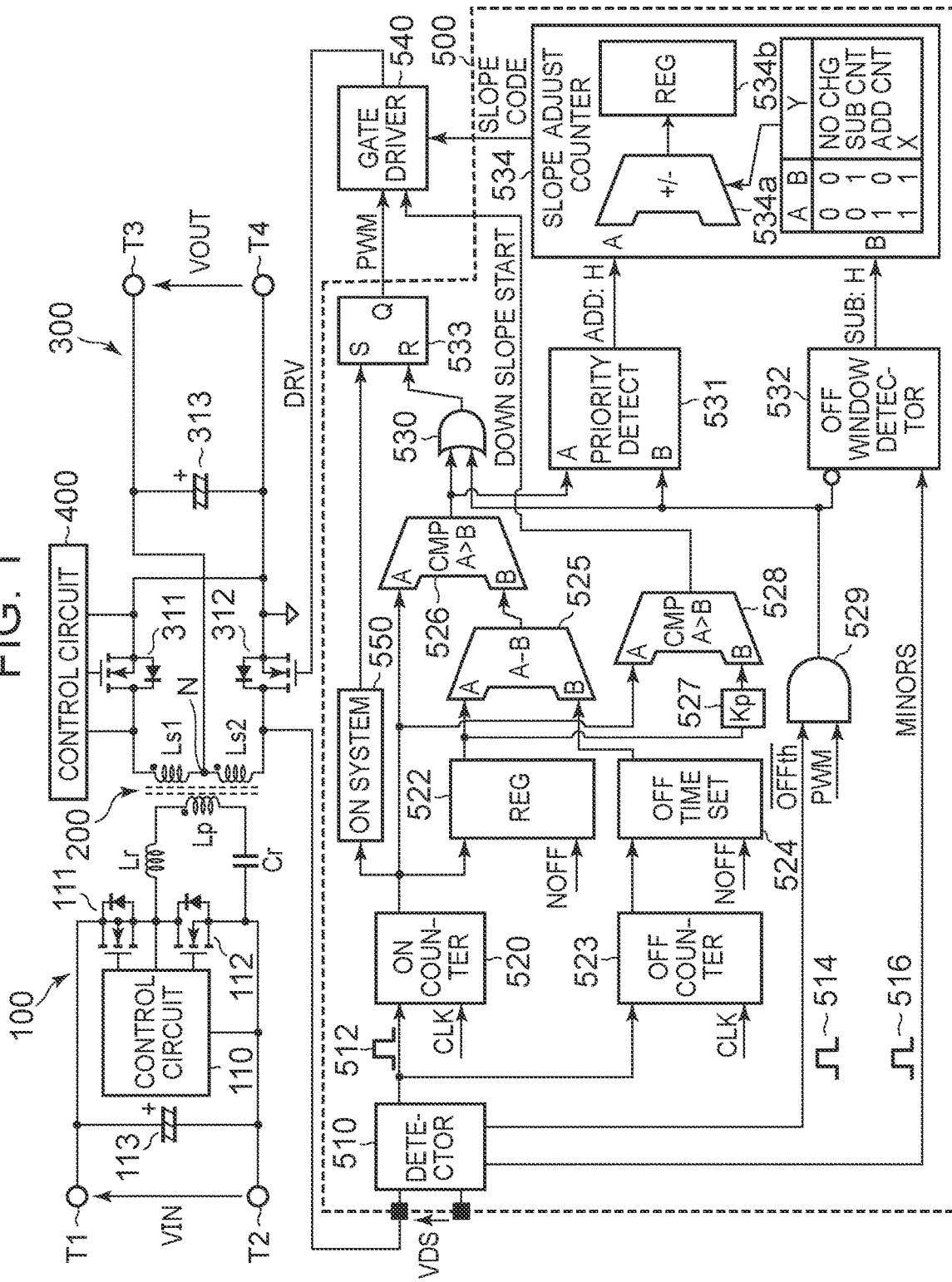
FIG. 1 is a block diagram illustrating a switching power supply apparatus according to one or more embodiments.

FIG. 1 is a block diagram illustrating a switching power supply apparatus according to one or more embodiments. The switching power supply apparatus includes a resonance circuit 100 on a primary side, a transformer 200, and a rectification smoothing circuit 300 on a secondary side. The rectification smoothing circuit 300 on the secondary side has a first control circuit 400 and a second control circuit 500 connected. The resonance circuit 100 includes a coil Lp of the transformer 200, a resonance inductor Lr connected in series with the coil Lp, a resonance capacitor Cr connected in series with the coil Lp, and a capacitor 113. The resonance circuit 100 includes voltage input terminals T1 and T2 to which an input voltage VIN from a voltage source (not illustrated in the figure) is applied. The voltage source (not illustrated in the figure) may be a DC voltage source providing a DC voltage. The resonance circuit 100 also includes switching circuits 111 and 112 with N-channel MOS transistors and a control circuit 110 that is connected to gates of the switching circuits 111 and 112 and controls the resonance circuit 100 on the primary side. The control circuit 110 alternately controls the switching circuits 111 and 112 to turn on and off at a frequency near a resonance frequency, which causes the coil Lp on the primary side to generate a sinusoidal current. When a sinusoidal current flows in the coil Lp on the primary side, the transformer 200 generates a potential difference in a first coil Ls1 and a second coil Ls2 of the secondary side through an action of electromagnetic induction, which causes a current to flow in the first coil Ls1 and the second coil Ls2 on the secondary side.

The rectification smoothing circuit 300 on the secondary side includes a switching circuit 311 for synchronous rectification connected between the first coil Ls1 and output terminals T3 and T4, a switching circuit 312 connected between the second coil Ls2 and the output terminals T3 and T4, a first control circuit 400 that detects a source/drain voltage of the switching circuit 311 and generates ON and OFF control signals for the switching circuit 311, and a second control circuit 500 that detects a drain voltage (source/drain voltage) of the switching circuit 312 and generates ON and OFF control signals for the switching circuit 312. Switching circuits 311 and 312 may be synchronous rectification field effect transistors or synchronous rectification MOSFET (synchronous rectification metal oxide semiconductor field effect transistors).

The first control circuit 400 and the second control circuit 500 control switching circuits 311 and 312 complementary to turn on and off, respectively. The first control circuit 400 may turn on the switching circuit 311 in a first or second half of one cycle of a switching control of the control circuit 110, and the second control circuit 500 may turn on the switching circuit 312 in the second or first half of one cycle of the switching control of the control circuit 110. The rectification smoothing circuit 300 includes a smoothing capacitor 313 that stabilizes an output voltage VOUT applied to the output terminals T3 and T4, and the output terminal T3 is connected to a midpoint of the secondary-side coils of the transformer 200 (a connection node N between the first coil Ls1 and the second coil Ls2). In an operation, the input terminals T1 and T2 may be connected to a power source (not illustrated in the figure), and the output terminals T3 and T4 may be connected to a load (not illustrated in the figure).

The first control circuit 400 and the second control circuit 500 connected to the rectification smoothing circuit 300 on the secondary side are described. The first control circuit 400 may be configured identical to the second control circuit 500. The first control circuit 400 may be identical in operation to the second control circuit 500. Also, the first control circuit 400 may be identical to the second control circuit 500 with the timing of operation being half a cycle off.

The second control circuit 500 includes a detector 510, an ON counter 520, a previous cycle memory 522, and OFF counter 523, an OFF time setting circuit 524, a first comparison circuit 525, a second comparison circuit 526, a Kp calculation circuit 527, a third comparison circuit 528, a logic circuit 529, a logic circuit 530, a priority detection circuit 531, an OFF window detector 532, an SR (set-reset) latch 533, and a slope adjust counter 534. The switching power supply apparatus also includes a gate driver 540.

The detector 510 detects a voltage polarity of the switching circuit 312. The detector 510 receives at least a portion of a current flowing in the switching circuit 312. A voltage associated with the current may be referred to as a source-to-drain voltage VDS. The source-to-drain voltage VDS is a voltage between a drain and a source of the switching circuit 312. The detector 510 receives the source-to-drain voltage VDS and compares a threshold voltage ONth, a threshold voltage OFFth, and a third threshold voltage 516 (Minors) with the source-to-drain voltage VDS. The comparison allows monitoring the voltage polarity of the switching circuit 312 and determining whether a rectification mode of a body diode of the switching circuit 312 becomes on or off.

The ON counter 520 receives a first detection signal 512, which is a result of a comparison between the source-to-drain voltage VDS and the threshold value ONth, and a clock signal CLK, and outputs a cycle count value based on a period during which the switching circuit 312 is conducted. The ON counter 520 measures the time that the body diode and the ON resistance Ron of the switching circuit 312 is conducting. Specifically, the ON counter 520 outputs a cycle count value that quantifies a period of time the body diode and the ON resistance Ron of the switching circuit 312 is turned on based on a time interval according to the clock signal CLK.

The previous cycle memory circuit 522 stores conduction time of the previous cycle of the body diode and the ON resistance Ron of the switching circuit 312. Specifically, the previous cycle memory circuit 522 holds a cycle count value output by the ON counter 520. The cycle count value of the previous cycle is used for a calculation of the next cycle.

The OFF counter 523 receives the first detection signal 512, which is a result of a comparison between the source-to-drain voltage VDS and the threshold value ONth, and the clock signal CLK. The OFF counter 523 counts up an off-count value based on the first detection signal 512. The OFF counter 523 measures the time that the body diode of the switching circuit 312 is conducting. Specifically, after the ON resistance Ron of the switching circuit 312 is turned off, the OFF counter 523 outputs an off-counter value (OFF-COUNT) that quantifies a period of time the body diode of the switching circuit 312 is turned on based on a time interval according to the clock signal CLK.

The off-time setting circuit 524 receives the off-count value (OFF-COUNT) output by the OFF counter 523 and a threshold value NOFF. The off-time setting circuit 524 sets the time for the switching circuit 312 to turn off based on the off-count value (OFF-COUNT) and the threshold value NOFF.

The first comparison circuit 525 receives the cycle count value, which is an output of the previous cycle memory circuit 522, and the output from the off-time setting circuit 524, and calculates a PWM-OFF compare match value for the current cycle based on the conduction time in the previous cycle. The PWM-OFF compare match value may be calculated by subtracting the output of the off-time setting circuit 524 from the cycle count value.

The second comparison circuit 526 receives the PWM-OFF compare match value, which is an output of the first comparison circuit 525, and the cycle count value, which is an output of the ON counter 520, and compares the PWM-OFF compare match value and the cycle count value. The second comparison circuit 526 compares the PWM-OFF compare match value with the cycle count value, which is the output of the ON counter 520, and outputs a signal to stop transmitting a PWM signal when the PWM-OFF compare match value and the cycle count value become equal.

The Kp calculation circuit 527 receives the cycle count value of the previous cycle, which is the output of the previous cycle memory circuit 522, and outputs a Kp value that is smaller than the cycle count value of the previous cycle. The Kp value may be smaller than the cycle count value of the previous cycle, and may be 10%, 20%, 30%, 40%, 50%, 60%, 70%, 80%, 90%, etc. of the cycle count value of the previous cycle, for example. The Kp value may also be between 20% and 80% of the cycle count value of the previous cycle, for example. According to one or more embodiments, the Kp calculation circuit 527 outputs 50% of the cycle count value of the previous cycle as the KP value.

The third comparison circuit 528 receives the cycle count value output by the ON counter 520 and the Kp value output by the Kp calculation circuit 527, and compares the cycle count value and the Kp value. When the cycle count value output by the ON counter 520 and the Kp value output by the Kp calculation circuit 527 match, the third comparison circuit 528 outputs a down slope start signal.

The second control circuit 500 may adjust timing of decreasing a gate drive signal based on the drain voltage of the switching circuit 312 when the gate drive signal of the previous cycle is turned off.

The logic circuit 529 receives a second threshold signal 514 (OFFth) output by the detector 510 and a PWM signal, and outputs a logical conjunction of the negation of the second threshold signal 514 (OFFth) and the PWM signal. Therefore, the logic circuit 529 outputs a signal to stop the PWM signal when the source-to-drain voltage VDS detected by the detector 510 falls below the threshold value OFFth, even while the PWM signal output is still ongoing.

The logic circuit 530 receives the output of the logic circuit 529 and the output of the second comparison circuit 526, and outputs a logical disjunction of the outputs of the logic circuit 529 and the second comparison circuit 526.

The priority detection circuit 531 receives the output of the second comparison circuit 526 and the output of the logic circuit 529, and outputs a signal (ADD SIGNAL) to adjust a slope as described below. When the PWM signal is determined to be stopped by an output signal of the logic circuit 529, an ON resistance Ron at off-time is low from a Kp of the gate driver 540. Therefore, the priority detection circuit 531 outputs a signal (ADD SIGNAL) to adjust a gate voltage of the switching circuit 312 (may be also referred to as a gate drive signal DRV) to increase a slope of the gate voltage. The ON resistance Ron may be defined as an on-resistance between the drain and source of the MOSFET of a switching circuit 312, and the on-resistance varies according to a gate voltage value applied to the gate.

The OFF window detector 532 receives the output of the logic circuit 529 and a third threshold voltage 516 (Minors) output by the detector 510, and outputs a signal (SUB SIGNAL) to adjust a slope as described below. When the output of the logic circuit 529 exceeds the third threshold voltage 516 (Minors), the ON resistance Ron of the gate driver 540 at off-time is high. Therefore, the OFF window detector 532 outputs a signal (SUB SIGNAL) to adjust the slope of the gate drive signal DRV to be smaller. In other words, the OFF window detector 532 outputs a signal (SUB SIGNAL) to adjust the slope in a flat direction.

The SR latch 533 receives a signal output by an ON system 550 and a signal output by the logic circuit 530, and outputs the PWM signal under a specified condition.

The slope adjust counter 534 receives the signal (ADD SIGNAL) output by the priority detection circuit 531 and the signal (SUB SIGNAL) output by the OFF window detector 532, and outputs a slope code signal. The slope code signal is a signal to adjust the ON resistance Ron just before the gate voltage of the switching circuit 312 turns off. The slope adjust counter 534 may include a fourth comparison circuit 534a and a register 534b. The slope code is stored in the register 534b, and the fourth comparison circuit 534a adds or subtracts the slope code based on the input ADD SIGNAL and SUB SIGNAL, and outputs the result to the register 534b. Thus, by updating the slope code stored in the register 534b, the gate drive signal DRV output by the gate driver 540 may be more finely controlled.

The signal (ADD SIGNAL) output by the priority detection circuit 531 is a signal A, and the signal (SUB SIGNAL) output by the OFF window detector 532 is a signal B. The slope adjust counter 534 maintains the current slope when the signal A is 0 and the signal B is also 0, that is, when both the priority detection circuit 531 and the OFF window detector 532 determine that no slope adjustment is necessary. When the signal A is 1 and the signal B is 0, that is, when the priority detection circuit 531 determines that slope adjustment is necessary and the OFF window detector 532 determines that slope adjustment is unnecessary, the slope adjust counter 534 increases the slope, that is, adjusts the slope to be steeper. When the signal A is 0 and the signal B is 1, that is, the priority detection circuit 531 determines that slope adjustment is unnecessary and the OFF window detector 532 determines that slope adjustment is necessary, the slope adjust counter 534 decreases the slope, that is, adjusts the slope to be gentle. These results are output as slope codes. The slope code may be a numerical value of the slope.

The gate driver 540 receives the PWM signal output by the SR latch 533, the down slope start signal output by the third comparison circuit 528, and the slope code signal output by the slope adjust counter 534. The gate driver 540 outputs the gate drive signal DRV based on the PWM signal. The gate driver 540 adjusts the timing to lower the gate drive signal DRV based on the down slope start signal. The gate driver 540 adjusts the voltage of the gate drive signal DRV based on the slope code signal. Specifically, the gate driver 540 lowers the voltage of the gate drive signal DRV based on the slope code signal. When the slope adjust counter 534 increases a slope angle, that is, increases the slope code to adjust to steepen the slope, the gate driver 540 outputs gate drive signal DRV that changes from ON to OFF more steeply than in the previous cycle to increase the ON resistance Ron. When the slope adjust counter 534 decreases the slope angle, that is, decreases the slope code to adjust the slope to be more gradual, the gate driver 540 outputs the gate drive signal DRV that changes from ON to OFF more gradual than in the previous cycle to decrease the ON resistance Ron.

The ON system 550 controls the timing at which the switching circuit 312 turns on. For example, the timing at which the switching circuit 312 turns on may be controlled to reduce efficiency loss due to increased rectification current and circuit current when the switching circuit 312 turns on. A capacitive current is observed as a current spike during an initial period when the current begins to flow in the body diodes of the switching circuit 311 and the switching circuit 312. When a load current is large, the rectification current flows simultaneously with the current spike, but when the load current is small, the rectification current flows after the current spike oscillates and flows. Therefore, in a synchronous rectification switching power supply apparatus, when the switching circuit 312 or the switching circuit 311 is turned on by the capacitive current, a reverse current flows from the smoothing capacitor 313 to the switching circuit 312 or the switching circuit 311, a rectification current increases to make up for the discharged current, and an increase in the circuit current causes a loss and reduces efficiency. The ON system 550 may control the timing at which the switching circuit 312 turns on in above-mentioned condition to reduce the reduction in efficiency.

Figure 2:
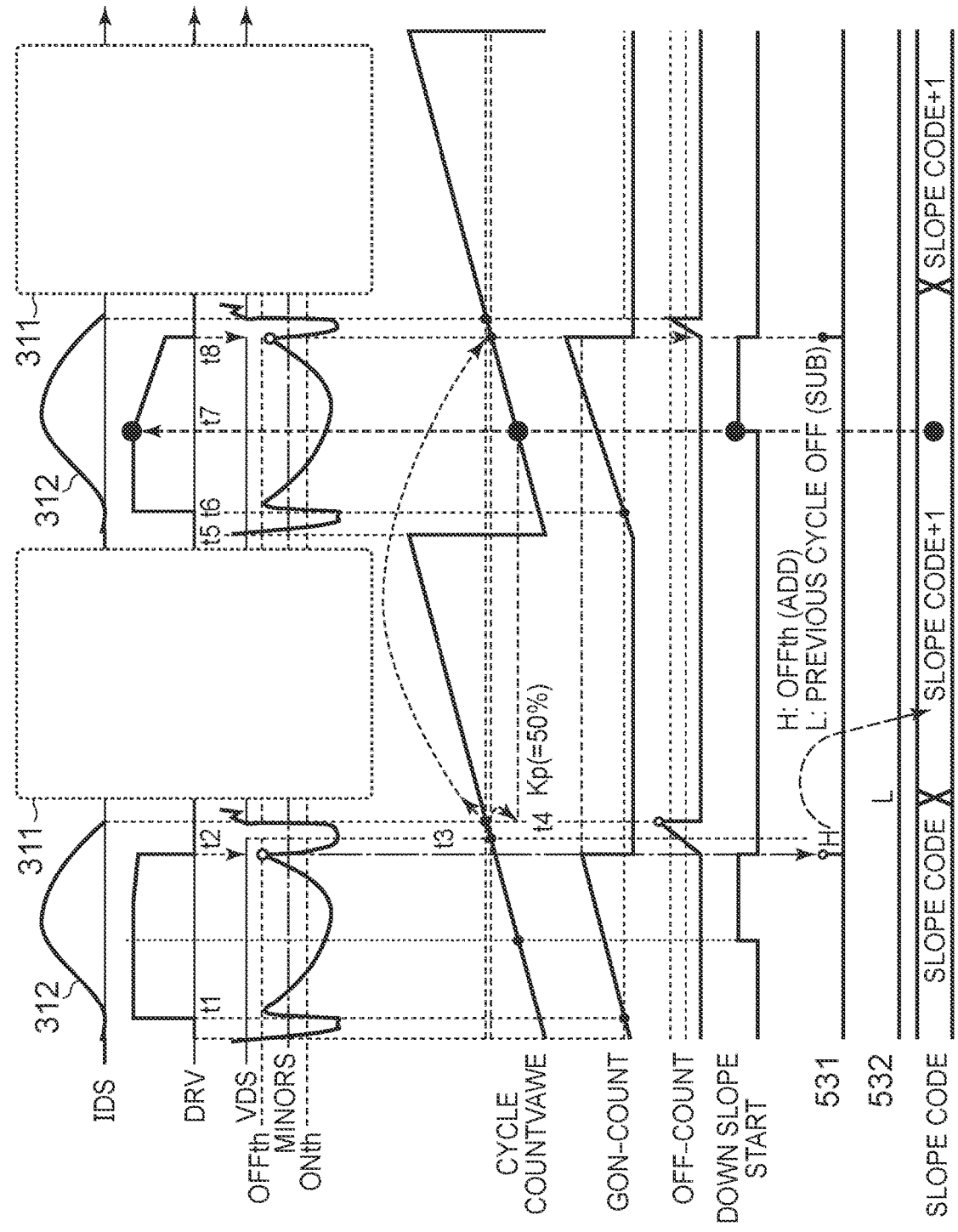
FIG. 2 is a waveform diagram illustrating an operation of a switching power supply apparatus according to one or more embodiments.

FIG. 2 is a waveform diagram illustrating an operation of a switching power supply apparatus according to one or more embodiments. The horizontal axis indicates time. A waveform IDS indicates a drain current of the switching circuit 312, and a waveform DRV indicates a drive voltage applied to the gate of the switching circuit 312. In one or more embodiments, the waveform DRV may be the gate drive signal DRV from the gate driver 540. A waveform VDS indicates the drain-to-source voltage of the switching circuit 312. As illustrated in FIG. 2, the second control circuit 500 controls the switching circuit 312 to turn on in a first half of one cycle, and the first control circuit 400 controls the switching circuit 311 to turn on in a second half of one cycle. The switching circuit 312 and switching circuit 311 are illustrated every half cycle. In FIG. 2, a waveform of the switching circuit 312 of the second control circuit 500 is illustrated, and a waveform of the switching circuit 311 is omitted.

In FIG. 1, a power source (not illustrated in the figure) is connected to the input terminals T1 and T2 of the resonance circuit 100 on the primary side, and voltage is supplied to the resonance circuit 100 on the primary side. In addition, a load is connected to the output terminals T3 and T4 of the rectification smoothing circuit 300 on the secondary side. Thus, according to one or more embodiments, the switching power supply apparatus is put into operation.

The drain current IDS of the switching circuit 312 flows as illustrated in the waveform IDS. First, after the drain current IDS flows through the body diode of the switching circuit 312, when the source-to-drain voltage VDS is once detected to be lower than a threshold value ONth and then an ON System 550 detects that the ON time is maintained above the time defined by the threshold value ONth once, the gate drive signal DRV from the gate driver 540 is turned on. The time at which the gate drive signal DRV is turned on is defined as t1. Thereafter, at a predetermined timing, the gate drive signal DRV from the gate driver 540 turns off. The time at which the gate drive signal DRV turns off is defined as t2. At the time t2, GON-COUNT is reset. When the gate drive signal DRV is detected to be off, the OFF counter 523 receives the first threshold signal 512 (ONth), which is the result of a comparison between the source-to-drain voltage VDS and the threshold value ONth, and the clock signal CLK, and counts up the off-count value (OFF-COUNT) based on the first detection signal 512. Then, a cycle count value exceeds a predetermined value at time t3, and the off-count value is reset at time t4 when the source-to-drain voltage VDS exceeds the threshold value ONth. The cycle count value at the time t4 is temporarily stored and used for the next cycle. A decreased cycle count value is set for the decreased cycle count value at the time t4. 50% of the cycle count value is set as a decreased cycle count value (Kp value).

Since the source-to-drain voltage VDS reaches the threshold value OFFth at the time t2 and the cycle count value of the previous cycle reaches a predetermined threshold value at the time t3, the priority of slope adjustment is additive and the slope code is added. On the other hand, when the time at which the cycle count value of the previous cycle reaches the predetermined threshold value is earlier than the time at which the source-to-drain voltage VDS reaches the threshold value OFFth, the priority of slope adjustment becomes subtraction and the slope code is subtracted.

Control of the switching circuit 311 is performed, and control of the switching circuit 312 is initiated again at time t5. At time t6, the gate drive signal DRV from the gate driver 540 is turned on. At time t7, the cycle count value reaches the decreased cycle count value (Kp value), and the slope adjustment of the gate drive signal DRV begins. At time t8, the gate drive signal DRV turns off, and GON-COUNT is reset. At the time t8, the OFF counter 523 receives the first threshold signal 512 (ONth), which is the result of a comparison between the source-to-drain voltage VDS and the threshold value ONth, and the clock signal CLK, and counts up the off-count value (OFF-COUNT) based on the first detection signal 512.

Since the source-to-drain voltage VDS does not reach the threshold value OFFth at the time t8 and the cycle count value of the previous cycle reaches the specified threshold value, the slope code is maintained.

In the above-described manner, the slope of the gate drive signal DRV is adjusted. Thus, the effect of a parasitic inductor on current detection of the detector 510 may be relatively suppressed by increasing the impedance of the ON resistance Ron value of the switching circuit 312 at the time of rectification current reduction.

Figure 3:
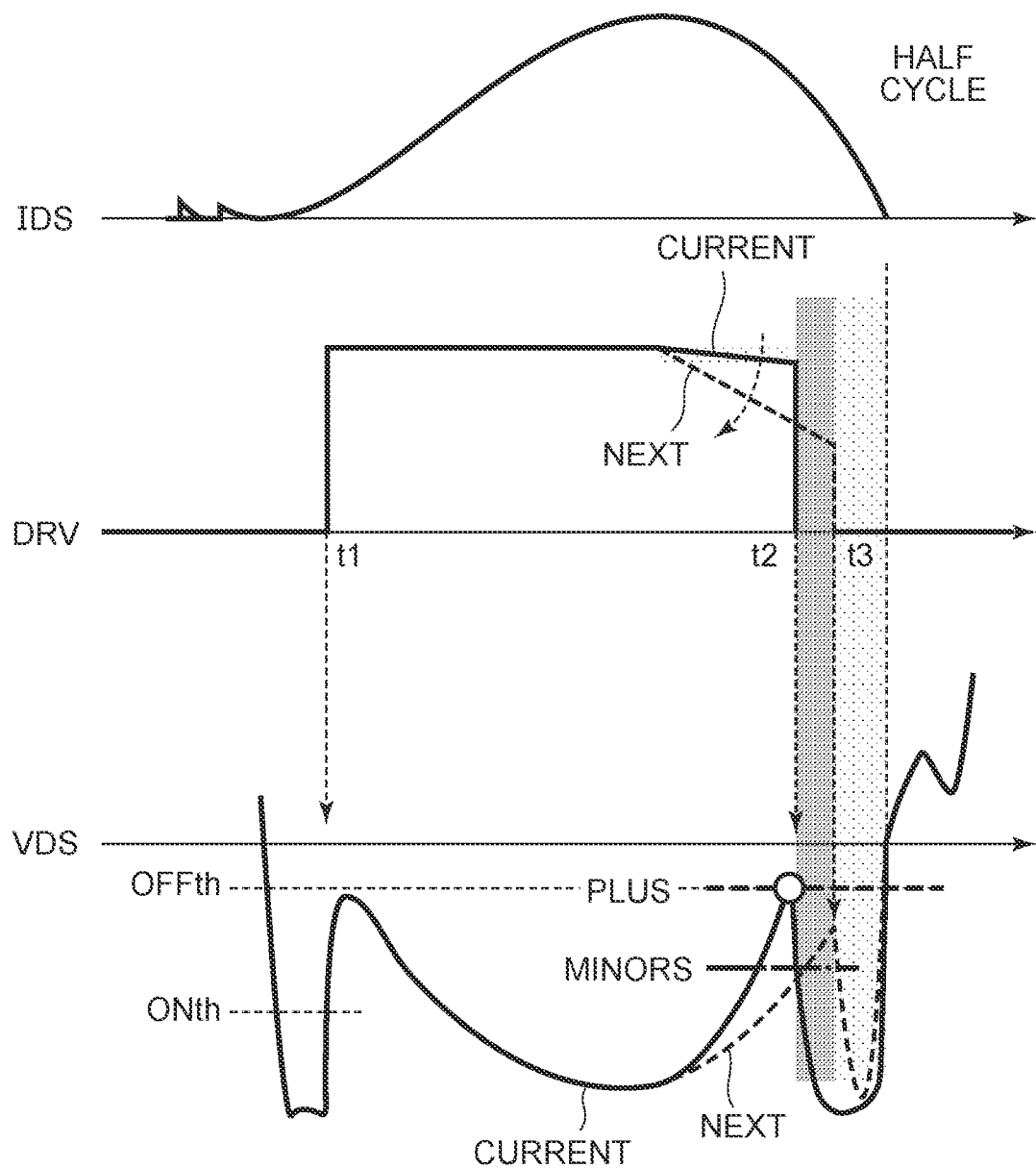
FIG. 3 is a waveform diagram illustrating an operation of a switching power supply apparatus according to one or more embodiments in which, a priority detection circuit (e.g. 531) determines that slope adjustment is necessary and an OFF window detector (e.g. 532) determines that slope adjustment is unnecessary.

FIG. 3 is a waveform diagram illustrating an operation of a switching power supply apparatus according to one or more embodiments. The horizontal axis indicates time. Waveforms IDS, DRV, and VDS are illustrated. These waveforms may be the same as the waveforms IDS, DRV, and VDS illustrated in FIG. 2, so that the descriptions are omitted. FIG. 3 is a waveform diagram illustrating an operation under a condition, especially when the priority detection circuit 531 determines that slope adjustment is necessary and the OFF window detector 532 determines that slope adjustment is unnecessary, the slope is increased, i.e., the slope is adjusted to be steeper. As illustrated in the waveform IDS, the drain current IDS of the switching circuit 312 is assumed to flow. First after the drain current IDS flows through the body diode, when the source-to-drain voltage VDS is once detected to be lower than the threshold value ONth and then an ON system 550 detects that the on time is maintained above the time defined by the threshold ONth once, the gate drive signal DRV from the gate driver 540 is turned on. The time at which the gate drive signal DRV is turned on is defined as t1. Thereafter, when the gate drive signal DRV from the gate driver 540 is turned off and the source-to-drain voltage VDS is detected to be higher (in the Plus direction in FIG. 3) than the threshold value OFFth, the priority of slope adjustment becomes additive. The time at which the gate drive signal DRV turns off is defined as t2. The priority of slope adjustment becomes additive, and when the slope code is additive, the gate driver 540 increases the ON resistance Ron so that the gate drive signal DRV changes from ON to OFF more steeply compared to the previous cycle. The gate drive signal DRV illustrated by a dotted line in FIG. 3 indicates the next cycle. Therefore, the gate drive signal DRV of the next cycle (dotted line) changes from ON to OFF more steeply than the gate drive signal DRV of the previous cycle (solid line). The gate drive signal DRV of the next cycle (dotted line) is slower than the gate drive signal DRV of the previous cycle (solid line) in terms of the time that the gate drive signal DRV turns off. Specifically, the gate drive signal DRV of the previous cycle (solid line) turns off at t2, while the gate drive signal DRV of the next cycle (dotted line) turns off at t3.

Figure 4:
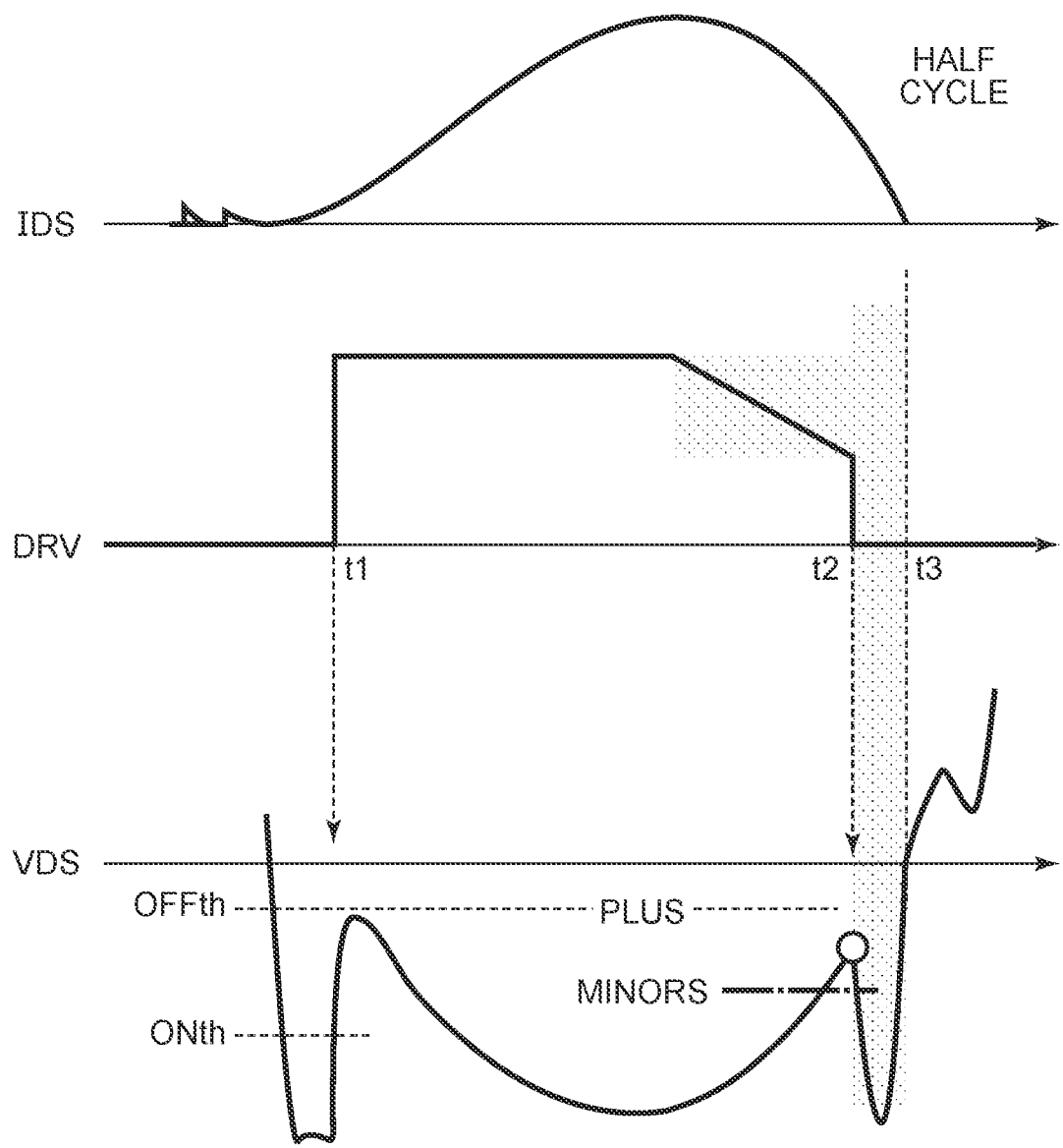
FIG. 4 is a waveform diagram illustrating an operation of a switching power supply apparatus according to one or more embodiments in which both a priority detection circuit (e.g. 531) and an OFF window detector (e.g. 532) determine that slope adjustment is unnecessary.

FIG. 4 is a waveform diagram illustrating an operation of a switching power supply apparatus according to one or more embodiments. The horizontal axis indicates time. Waveforms IDS, DRV, and VDS are illustrated. These waveforms may be the same as the waveforms IDS, DRV, and VDS illustrated in FIG. 2, so that the descriptions are omitted. FIG. 4 is a waveform diagram illustrating an operation under a condition, especially when the priority detection circuit 531 determines that slope adjustment is unnecessary. The drain current IDS of the switching circuit 312 flows through the body diode of the switching circuit 312, as illustrated in the waveform IDS. When the source-to-drain voltage VDS is once detected to be lower than a threshold value ONth and then when the ON-System 550 detects that the ON time is maintained for longer than the time defined by the threshold value ONth once, the gate drive signal DRV from the gate driver 540 is turned on. The time at which the gate drive signal DRV is turned on is defined as t1. Thereafter, when the source-to-drain voltage VDS is detected to lower (intermediate position between Plus and Minors in FIG. 4) than the threshold value OFFth, the gate drive signal DRV from the gate driver 540 turns off due to the output of the stop signal of the second comparison circuit 526, as shown in t8 in FIG. 2. The time at which the gate drive signal DRV is turned off is defined as t2. When the timing of turning off the gate drive signal DRV is judged to be appropriate, the timing of turning off the gate drive signal DRV is maintained at the same timing as the timing of turning off the gate drive signal DRV in the previous cycle. The slope of the gate drive signal DRV from ON to OFF is also maintained at the same slope as that of the gate drive signal DRV of the previous cycle.

Figure 5:
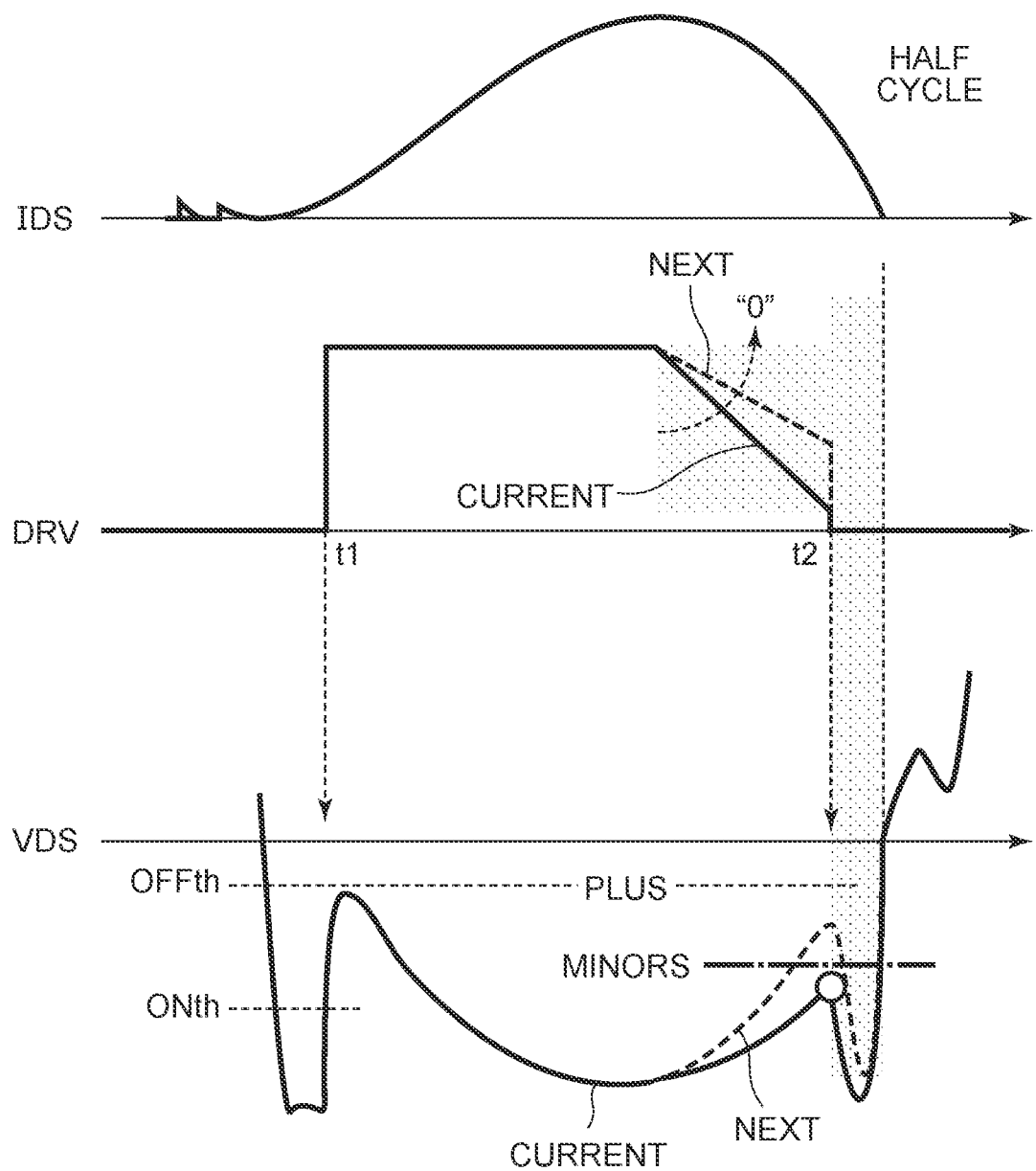
FIG. 5 is a waveform diagram illustrating an operation of a switching power supply apparatus according to one or more embodiments in which a priority detection circuit (e.g. 531) determines that slope adjustment is unnecessary and an OFF window detector (e.g. 532) determines that slope adjustment is necessary.

FIG. 5 is a waveform diagram illustrating an operation of a switching power supply apparatus according to one or more embodiments. The horizontal axis indicates time. Waveforms IDS, DRV, and VDS are illustrated. These waveforms may be the same as the waveforms IDS, DRV, and VDS illustrated in FIG. 2, so that the descriptions are omitted. FIG. 5 is a waveform diagram illustrating an operation under a condition, especially when the priority detection circuit 531 determines that slope adjustment is unnecessary and the OFF window detector 532 determines that slope adjustment is necessary, the slope is reduced, i.e., the slope is adjusted to be gentle. The drain current IDS of the switching circuit 312 flows through the body diode of the switching circuit 312, as illustrated in the waveform IDS. When the source-to-drain voltage VDS is once detected to be lower than a threshold value ONth and then when the ON-System 550 detects that the ON time is maintained for longer than the time defined by the threshold value ONth, the gate drive signal DRV from the gate driver 540 is turned on. The time at which the gate drive signal DRV is turned on is defined as t1. Thereafter, when the gate drive signal DRV from the gate driver 540 is turned off and the source-to-drain voltage VDS is detected to be lower than the third threshold voltage 516 (Minors), the priority of slope adjustment becomes subtractive. The time at which the gate drive signal DRV turns off is defined as t2. When the priority of slope adjustment becomes subtraction and the slope code is subtracted, the gate driver 540 decreases the ON resistance Ron so that the gate drive signal DRV changes from ON to OFF more gently compared to the previous cycle. The gate drive signal DRV illustrated by a dotted line in FIG. 5 indicates the gate drive signal DRV of the next cycle. Therefore, the gate drive signal DRV of the next cycle (dotted line) changes from ON to OFF more gradually than the gate drive signal DRV of the previous cycle (solid line). The gate drive signal DRV of the next cycle (dotted line) is the same as the gate drive signal DRV of the previous cycle (solid line) in terms of the time that the gate drive signal DRV turns off.

As described above, a switching power supply apparatus according to one or more embodiments may control the gate voltage of the switching circuit 312 to turn off. The timing of lowering the gate drive signal of the gate voltage of the switching circuit 312 is adjusted, and the on-resistance Ron of MOSFET is increased, thereby the influence of a parasitic inductor on current detection may be relatively suppressed. Accordingly, the turn-off timing of the gate drive signal of the switching circuit 312 may be accurately detected. As the switching circuits 311 and 312 can be optimally on-drive, the loss of the synchronous rectifier circuit may be reduced.

The invention claimed is:
1. A switching power supply apparatus comprising:
a series resonance circuit on a primary side;
a rectification smoothing circuit on a secondary side; and
a transformer comprising a first coil connected to the series resonance circuit on the primary side and a second coil connected to the rectification smoothing circuit on the secondary side, a current produced in the second coil in response to a current in the first coil;
wherein
the rectification smoothing circuit on the secondary side comprises:
a switching circuit used for synchronous rectification connected in series with the second coil; and
a secondary-side control circuit that controls the switching circuit to turn the switching circuit on and off, comprising:
a detector that compares a drain voltage of the switching circuit with a first threshold voltage and outputs a first detection signal;
an ON counter that detects a period of time during which a current flows in the switching circuit based on the first detection signal, counts the period of time based on a predetermined clock cycle, and outputs a cycle count value;
a previous cycle memory that holds the cycle count value;
an OFF counter that detects a period of time during which a current flows through a body diode in a state where no current flows through an on resistance of the switching circuit based on the first detection signal, counts the period of time based on a predetermined clock cycle, and outputs an off-count value;
an off-time setting circuit that sets the time to turn off the switching circuit based on the off-count value;
a first comparison circuit that compares the cycle count value stored in the previous cycle memory with the time to turn off the switching circuit set by the off-time setting circuit;
a second comparison circuit that compares a cycle count value output by the ON counter with a comparison result output by the first comparison circuit and outputs a signal to stop transmitting a (pulse width modulation) PWM signal;
a (set-reset) SR latch that receives a signal from the second comparison circuit to stop transmitting the PWM signal and outputs the PWM signal to be applied to a gate of the switching circuit; and
a gate driver that outputs a gate drive signal for on/off control of the switching circuit based on the PWM signal.

2. The switching power supply apparatus according to claim 1, wherein:
   the secondary-side control circuit further comprises:
      a Kp calculation circuit that receives the cycle count value held by the previous cycle memory and outputs a decreased cycle count value that is smaller than the cycle count value; and
      a third comparison circuit that receives the decreased cycle count value, compares the decreased cycle count value with a cycle count value output by the ON counter, and outputs a down slope start signa; and
   the gate driver adjusts the timing of lowering a gate drive signal based on the down slope start signal and outputs a gate drive signal to control the switching circuit to turn on and off based on the PWM signal.

3. The switching power supply apparatus according to claim 2, wherein
   the Kp calculation circuit receives the cycle count value held by the previous cycle memory and outputs a decreased cycle count value that is between 20% and 80% of the cycle count value.

4. The switching power supply apparatus according to claim 2, wherein
   the secondary-side control circuit adjusts the timing of lowering a gate drive signal based on the drain voltage of the switching circuit when the gate drive signal of the previous cycle is turned off.

5. The switching power supply apparatus according to claim 2, wherein:
   the secondary-side control circuit further comprises:
      a logic circuit that inputs the PWM signal and a second threshold value;
      a priority detection circuit that outputs an add signal to increase a slope of the gate drive signal based on output of the logic circuit and output of the second comparison circuit;
      an OFF window detector that outputs a sub signal to reduce the slope of the gate drive signal based on output of the logic circuit and a third threshold value; and
      a slope adjust counter that receives the add signal and the sub signal and calculates a slope code to adjust the slope to lower the gate drive signal based on the add signal and the sub signal; and
   the gate driver adjusts the slope to lower the gate drive signal based on the slope code, adjusts the timing to lower the gate drive signal based on the down slope start signal, and outputs the gate drive signal to control the switching circuit to turn on and off based on the PWM signal.

* * * * *